Dec. 25, 1945. T. H. WHALEY 2,391,607
HIGH PRESSURE SEPARATION PROCESS
Filed Oct. 5, 1942 3 Sheets-Sheet 1

FIG. 1

INVENTOR
THOMAS H. WHALEY
BY
ATTORNEYS

Patented Dec. 25, 1945

2,391,607

UNITED STATES PATENT OFFICE 2,391,607

HIGH PRESSURE SEPARATION PROCESS

Thomas H. Whaley, Bartlesville, Okla., assignor to Phillips Petroleum Company, a corporation of Delaware Application October 5, 1942, Serial No. 460,860

10 Claims. (Cl. 196—88)

The present invention relates to the separation of a fluid mixture into fractional parts having different physical properties.

Within certain temperature ranges above the critical temperature, many fluid mixtures exhibit a phenomenon which has been termed "retrograde condensation." A number of fluid mixtures have been investigated; recently, many of them have been mixtures of hydrocarbons. Unfortunately, the many investigators have not been in agreement as to the definition of the term "retrograde condensation" nor as to the portion of the phase diagram which represents the region in which retrograde condensation takes place. Some contend that retrograde condensation will take place anywhere in the vapor-liquid two-phase region above the critical temperature, or the temperature corresponding to the critical point. Others contend that retrograde condensation takes place in the vapor-liquid two-phase region above the critical temperature only within certain pressure ranges. In this regard, some investigators have used the term "retrograde condensation" to designate the reverse of normal condensation. This latter approach is preferred and will be used in the present disclosure.

The critical point is that point on the phase diagram, defined by temperature and pressure in any given system, where the bubble point curve joins the dew point curve and the two phases, liquid and vapor, have the same physical properties thereby becoming indistinguishable. In the vapor-liquid two-phase region, at any given temperature above the critical, within a certain range of pressures, a decrease in pressure causes an increase in the volume of the more dense or liquid phase and isothermal retrograde condensation is said to take place. In a lower pressure range at the same temperature, a decrease in pressure causes a decrease in the volume of the more dense phase and isothermal normal vaporization is said to take place. Conversely, as the pressure is increased, isothermal normal condensation takes place in the lower pressure range and isothermal retrograde vaporization takes place in the pressure range in which retrograde condensation will occur. The determination of the pressure range in which retrograde condensation occurs for a series of temperatures above the critical temperature and within the vapor-liquid two-phase region determines the portion of the region in which isothermal retrograde condensation occurs. To avoid confusion, this foregoing terminology will be used throughout the present specification and it corresponds to that set forth in the publication by Katz and Kurata, Ind. and Eng. Chem., vol. 32, pp. 817–827, (June 1940). It will be apparent to one skilled in the art that the above discussion of retrograde condensation relates only to the phenomenon occurring with changes in pressure at temperatures above the critical temperature and not with the phenomenon occurring with changes in temperature at pressures above the critical pressure. The latter phenomenon is referred to as the "isobaric retrograde phenomenon."

The relationship between the two phases (vapor and liquid) in any given system may be determined and correlated relative to the temperature and pressure. An arbitrary constant, known as the equilibrium constant K, has been employed for the purpose of these correlations. This equilibrium constant K may be defined as the ratio of the mol fraction of any given component in the gaseous phase to the mol fraction of the component in the liquid phase at a stated temperature and pressure. In a system in which the composition of the fluid mixture is fixed, the equilibrium constant behaves as a true constant. The equilibrium constant for a given component is affected, however, by the composition of the mixture in which the component is included.

The equilibrium constants for a given component of a mixture of saturated hydrocarbons in an isothermal system decrease with increase in pressure until a certain pressure is reached, after which upon further increase in pressure the equilibrium constants of the most volatile saturated hydrocarbon component of the mixture decreases still further until the pressure corresponding to the critical point is reached while the equilibrium constants of the less volatile saturated hydrocarbon components increase until the pressure corresponding to the critical pressure is reached. The reversal in the equilibrium constants results in some phenomena of great practical importance when dealing with mixtures of hydrocarbons at high pressures. For a more nearly complete discussion of the K-constants and the variations with pressure, reference is made to the article by Katz and Hacmuth, Vaporization equilibrium constants in a crude oil-natural gas system, Ind. & Eng. Chem. 29, 1072–1077, (1937).

It has been proposed in a copending application, Serial No. 457,490 in which I am a co-inventor, to apply the foregoing principles to the separation of petroleum products into fractions having varying boiling ranges. The present invention relates specifically to the separation of lube oil stocks from crude oil containing paraffinic components suitable for the manufacture of lubricating oils.

Lube oil stocks are at present prepared from mixed base crude oil bottoms by steam and vacuum distillation, acid treatment and/or solvent extraction.

The present invention provides an improved process for separating a paraffinic fraction, relatively low in or substantially free from asphaltic components, from a crude oil or from a lube oil stock.

In accordance with the present invention gas, preferably natural or other hydrocarbon gas, is brought into contact with the oil stock under high pressures, above 1,000 pounds per square inch and up to 10,000 pounds per square inch or higher. Phase equilibrium between the gas and liquid is established or closely approached. Some of the paraffinic components of the oil vaporize at the high pressure, but substantially all of the asphaltic hydrocarbons remain in the liquid phase. Under batch conditions the vaporized paraffins may be said to be vaporized by "retrograde vaporization" or as the result of the "isothermal retrograde phenomena." The desirable constituents may be recovered from this vapor phase at high pressure in any suitable manner as by absorption or condensation. The equilibrium vapor phase at high pressures exhibits the retrograde condensation phenomenon and recovery methods used at present for recovery of condensate from distillate type wells are applicable.

The present invention is particularly applicable in cases where a distillate field or other source of high pressure natural gas is located near a source of mixed base crude oil. Along the Gulf Coast of the United States there is at present considerable production from distillate fields. These fields produce a fluid which may be separated into a light colored hydrocarbon liquid of high A. P. I. gravity and a relatively dry natural gas at high gas-oil ratios. Recovery of the condensibles may be made by condensation or absorption.

Distillate wells are at present produced at pressures ranging between 1,000 and 6,000 pounds per square inch. Even higher pressures may be expected as well depths are increased. Condensation methods of recovery of the liquid from the well fluid involve cooling to cause natural condensation and pressure reduction to take advantage of the phenomenon of retrograde condensation. High pressure absorption processes are known by which the desirable liquid components may be recovered with very little reduction in pressure. Such a process is disclosed by Moore et al. in Patent No. 2,261,927 and by D. L. Katz in a copending application, Serial No. 436,647. Present practice is to recover as much of the desirable components as possible and to return the residue gases to the producing formations through suitable input wells. In accordance with the present invention, the fluid produced from the distillate wells is brought into contact under high pressure with a stream of mixed base crude oil or other suitable stock and the equilibrium vapor phase separated therefrom. The desirable components are extracted from the vapor phase thereby effecting recovery of the lubricating oil stocks previously separated from the crude oil and at the same time recovering some of the desirable constituents from the fluid produced from the distillate well. Distillate wells or gas wells which do not contain a sufficient quantity of components suitable for motor fuels or fuel oil to be processed economically by present methods of production may be economically produced for use in the present invention. Details of the operation of the invention will be more readily understood by reference to the drawings and the following detailed description. To those skilled in the art it will be apparent that the present invention may be employed in connection with a plant for recovery of distillate with a relatively small investment in additional equipment.

An object of this invention is to provide an improved process for extracting lubricating oil stocks from mixed oils.

Another object of this invention is to provide a novel process for extracting lubricating oil stocks from mixed oils by application of the principles of retrograde vaporization and condensation.

Still another object of this invention is to provide a low temperature process for the extraction of lubricating oil stock from crude oils.

A further object of this invention is to provide a process for extracting a substantially asphalt-free fraction from mixed oils containing paraffinic and asphaltic components.

Still other objects and many advantages of my process will be apparent to those skilled in the art from a careful study of the following detailed description in which.

Figure 1:
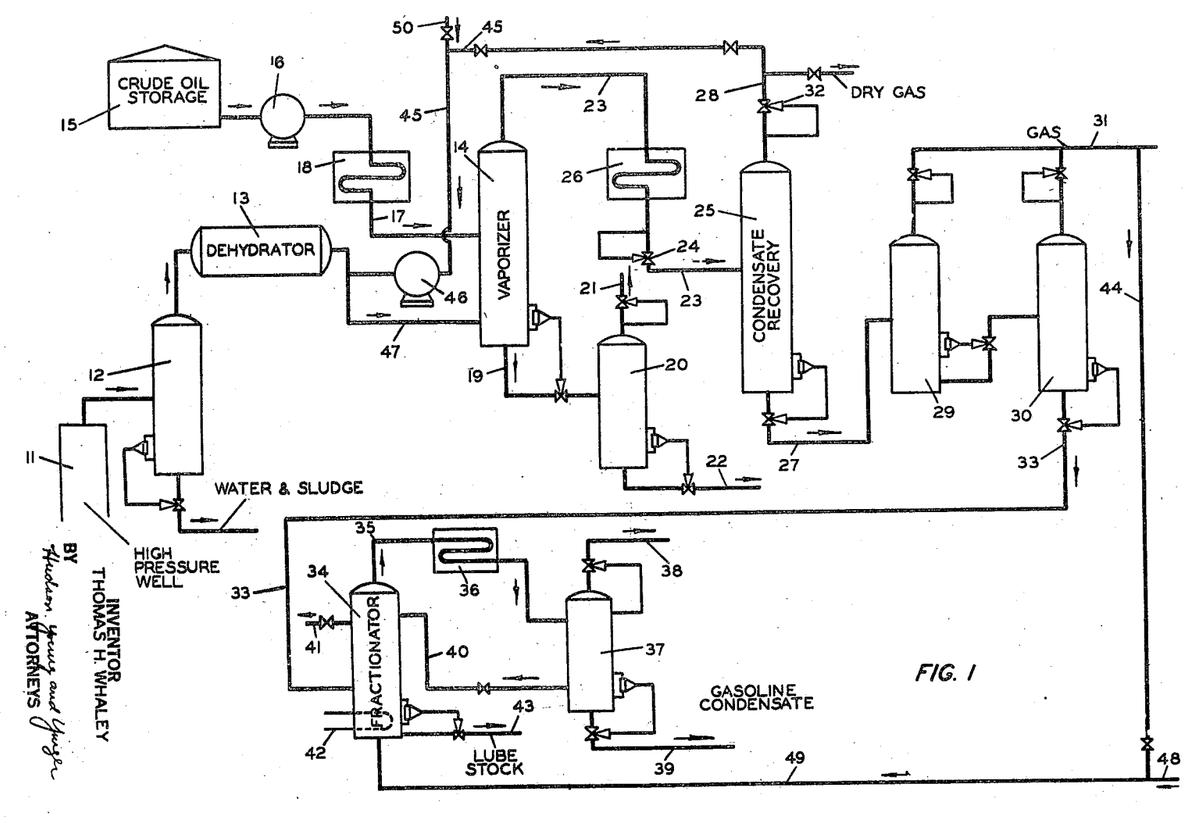
Figure 1 is a diagrammatic view of one form of apparatus for practicing my invention in which the high pressure vapors are subjected to pressure reduction for the condensation of hydrocarbons including those normally in lubricating oils along with lower boiling materials.

Referring now to Figure 1, fluid from a high pressure well 11 is passed through separator 12 to remove water and sludge and then through dehydrator 13 to remove water vapor. The dehydrated well fluid is passed to vaporizer 14 at substantially well head pressure through line 47 Crude oil containing components desirable in lubricating oil is drawn from storage tank 15 or other source and is pumped under pressure by pump 16 through line 17 into vaporizer 14 in which the crude oil and the high pressure well fluid are thoroughly contacted. Heater 18 may be installed in the crude oil line 17 if it is found desirable to heat the said oil for promotion of more nearly completely vaporization of the relatively high molecular weight lubricating oil fraction and the establishment of approximate equilibrium between the vapor phase and the residual crude oil phase. Applicant has found that a good degree of separation is usually attainable at atmospheric temperatures or temperatures within the range of approximately 50° to 200° F. although the temperature range is limited only by practical considerations. The maximum temperature is limited to that at which decomposition or other undesirable reactions occur.

The vaporizer 14 may be essentially any type of vessel in which intimate contact of gas and oil may be effected. A bubble plate column having a few plates, three or four plates, for example, is satisfactory.

The residual liquid from the vaporizer is withdrawn through bottom line 19, pressure reduced to essentially atmospheric and the gas evolved by this pressure reduction separated from the residue in separator 20. This separated gas exits through gas line 21 while the residue or heavy ends comprising the unvaporized portion of the crude oil containing the asphaltic and less paraffinic components is withdrawn through bottoms line 22.

The vapor phase from the vaporizer 14 passes through vapor line 23, cooler 26, back pressure regulator 24, and into the condensate recovery tank 25 at reduced pressure. Retrograde condensation, supplemented by normal condensation resulting from cooling in cooler 26 and/or the Joule-Thompson effect through expansion at the back pressure regulator valve 24, takes place in the condensate recovery tank. The amount of condensate recovered and its nature depends to a considerable extent upon the pressure maintained on the condensate recovery tank 25 by its back pressure regulator 32, the uncondensed or dry gas being removed through dry gas line 28. The liquid condensate, withdrawn from the recovery tank 25 through line 27, passes into the stage separators 29 and 30 in which the pressure is reduced to successively lower values and the dissolved gases removed and separated from the condensate pass out through gas line 31. The liquid or gas-free condensate from the stage separators passes through line 33 to the fractionator 34 in which the gasoline and lighter oils are removed from the lubricating oil stock. This fractionator may be of conventional design and is equipped with an overhead vapor line 35, side stream outlet or outlets as 41, heating coil 42 and bottoms (lubricating oil stock) outlet line 43. Condenser or cooler 36 is inserted in the overhead gasoline line 35 to condense the fractionator overhead, the condensate being separated in separator 37, the uncondensed vapors passing out through vapor line 38. A portion of the condensate may be returned to the fractionator as reflux through line 40 while the remainder is removed through line 39, as, say, a gasoline stock.

Line 45 may conduct all or a portion, if desired, of the effluent gas from the condensate recovery tank 25 (and line 28) as recycle gas, into the high pressure well fluid line 47 previous to entry of the latter into the vaporizer 14. Compression of this recycle gas is effected by compressor 46. Under certain conditions it may be desirable to divert a portion of the stage separator gas from line 44 through line 49 to assist in stripping the lubricating oil free from lighter hydrocarbons at relatively low temperatures. However, it is to be understood that steam or other stripping agent may be used in place of this said gas. In this latter case, the steam or other stripping agent may be, for convenience, introduced into the fractionator through lines 48 and 49.

In case extraneous hydrocarbon gas is desired, as to increase hydrocarbon gas-to-oil ratio to any desired value, and to aid in the separation, this hydrocarbon gas, such as for example, propane, butane or other selected hydrocarbon gas, may be added to the system through line 50.

In the operation of my process as set forth in the embodiment illustrated in Figure 1, the high pressure well fluid after removal of water and sludge, and dehydrated if desired, enters the vaporizer at essentially well head pressure, as for example, 4,000 pounds per square inch. Crude oil from storage or other source is pumped into the vaporizer at the same pressure, and the two materials, crude oil and high pressure well fluid are sufficiently contacted in this vaporizer that equilibrium between the two is substantially established. At this high pressure a portion of the crude oil will be vaporized. The fraction or percentage of the crude oil vaporized by this high pressure fluid at a given pressure may be controlled by variation of the gas-oil ratio and by control of temperature of the incoming crude oil. The vaporizer, as stated heretofore, may contain 3 or 4 bubble plates for effecting intimate contact between the fluid or gas and the oil. Above the top plate is a space within which the gas and oil have ample opportunity to become completely separated so that only gas or vapor may exit through the overhead line 23. The unvaporized more asphaltic portion of the crude oil accumulates in the base of the vaporizer and is withdrawn into flash separator 20 in which dissolved gases are flashed from said asphaltic residue by pressure reduction in said separator.

The overhead vapor, if equilibrium was attained in the vaporizer, is an equilibrium vapor, and by pressure reduction upon passage through the back pressure regulator 24, the equilibrium is disturbed. Thus upon reduction in pressure from the original 4,000 pounds per square inch to approximately 800 to 1,200 pounds per square inch, liquid is condensed by retrograde condensation, supplemented by normal condensation, and is separated from the remaining gas in the condensate recovery tank 25. The liquid condensate comprises the components vaporized from the oil in the vaporizer and condensable components present in the fluid from the high pressure well. The remaining gas is relatively dry as concerns content of readily condensable hydrocarbons and is removed from the said recovery tank 25 through back pressure regulator 32 and gas line 28. The gas from line 28 may be recompressed and recycled to the vaporizer or returned to the earth through a suitable input well.

The condensate or bottoms remaining after the dry gas removal, due to its pressure of approximately 800–1,200 pounds per square inch contains some quantity of dissolved gases and a large part of these are removed by successive pressure reductions in the stage separators 29 and 30. The pressure in separator 29 may be dropped, to say 300 pounds per square inch, and further dropped in separator 30 to say, 75 pounds per square inch.

The liquid condensate remaining after the aforesaid gas separation steps, is passed from the stage separator 30 through line 33 into the fractionator 34 from which the lubricating oil fraction is removed as bottoms. The fractionator may be so operated as to produce one or more side streams, as desired, with a gasoline vapor passing overhead. This vapor is condensed in condenser 36 and the condensate separated in receiver or separator 37, a portion of the condensate being recycled as reflux to the fractionator while the remainder passes out through line 39 as a gasoline stock. The uncondensed gases which may contain condensable material pass out through line 38 to a gasoline or light hydrocarbon recovery unit, or may be dispensed with as desired. In such plants the amount of hydrocarbons remaining uncondensed in separator 37 may be quite large due to solution of light hydrocarbons at the relatively low temperature of the liquid leaving stage separator 30. This low temperature is occasioned by the large amount of evaporation taking place in the vaporizer 14 in addition to the cooling effects by flashing off dissolved gases in the stage separators 29 and 30. A portion of the relatively dry gas from the condensate recovery tank 25 may be recycled through line 45, repressured by pump 46, into the high pressure well fluid line. If desired, a portion of the separator gas from line 31 may be by-passed through lines 44 and 49 as stripping gas for fractionating column 34, or other stripping agent as steam may be introduced through lines 48 and 49 into said column as stripping agent.

Figure 2:
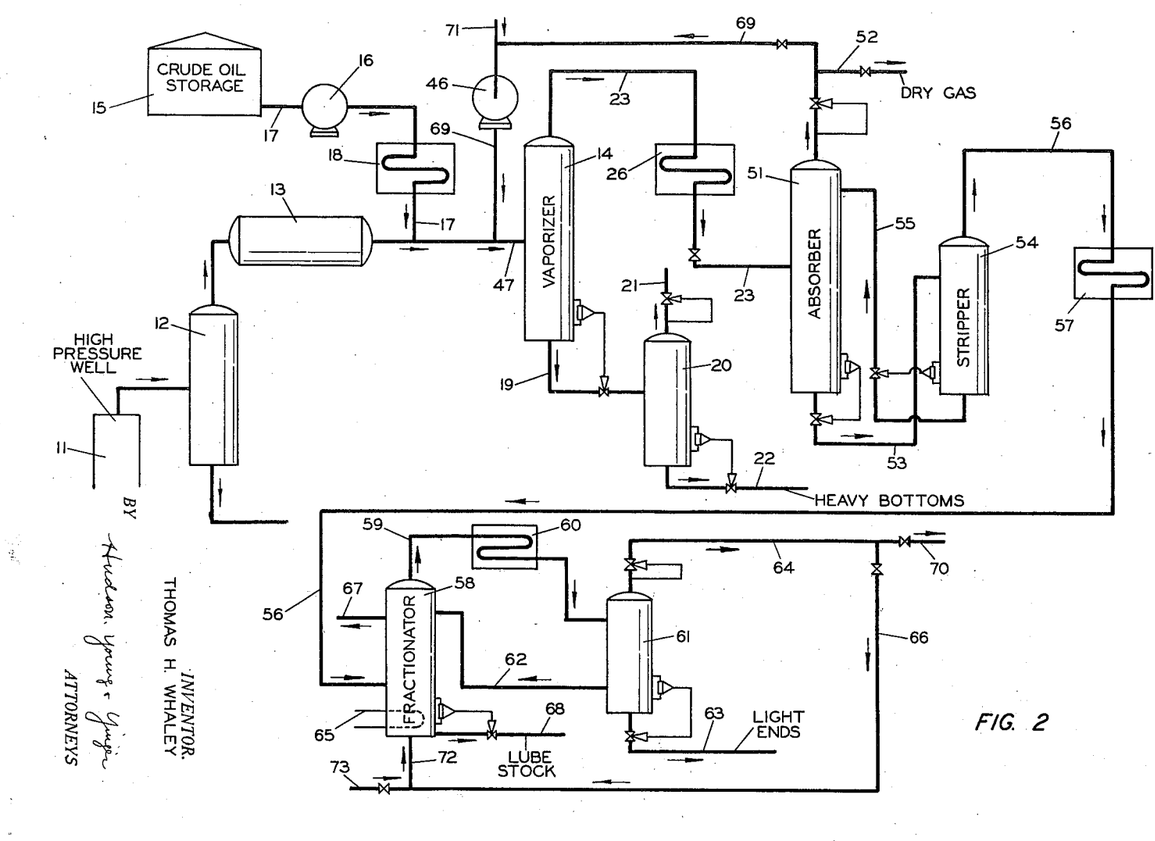
Figure 2 represents another form of apparatus in which the condensable hydrocarbons are removed from the high pressure vapors by a high pressure absorption step.

Figure 2 represents a second embodiment of my invention in which the high pressure gas is maintained at high pressure throughout the entire process so that the final lean gas may be recycled with only a minimum of recompression.

According to this embodiment, the high pressure well fluid, pretreated and dehydrated as above described is combined with the crude oil before being passed to the vaporizer 14 in the manner of "flash-flood" absorption. In the said vaporizer, which is maintained essentially at well pressure, and at temperatures ranging from approximately 50° to 200° F. or higher, the desired fractions of the crude oil are vaporized and separated from the residual liquid, said residue being withdrawn through line 19 into chamber 20 in which the dissolved gases are removed by pressure reduction. These gases exit through line 21 to be disposed of as desired and the heavy bottoms are withdrawn through line 22 for disposal.

The vaporizer effluent passes through line 23 and exchanger 26 into the high pressure absorber 51. High pressure dry gas exits from the top of said absorber 51 through line 52, a portion being recycled through line 69, repressured by pump 46 and passed into the high pressure well fluid line 47 previous to contacting with the crude oil from line 17. The enriched absorption oil containing hydrocarbons vaporized from the oil in the vaporizer and condensible components present in the vaporizing fluid leaves the bottom of the absorber and passes through line 53 into the stripper 54, the stripped absorbent returning to the absorber through line 55. The stripped hydrocarbons leave stripper 54 by line 56, are cooled in condenser 57, and pass on to the high pressure fractionator 58 which recovers the lubricating oil stock as bottoms, said bottoms being withdrawn through line 68 and passed on to intermediate or run storage, not shown, preparatory to subsequent treatment, such as dewaxing, etc. One or more side streams may be removed, as desired, from the fractionator, as for example, through takeoff 67. The overhead vapors pass through line 59, are condensed in condenser 60, and pass into separator 61. From this separator a portion of the light condensed hydrocarbons or light ends are withdrawn through line 62 and passed as reflux to the fractionator, the remainder being withdrawn through line 63 for disposal, as desired; while the uncondensed portion passes through line 64, a portion of the latter passing through line 66 and entering the base of the fractionator at inlet 72 as a stripping agent, the remaining portion being passed from the system through outlet line 70 for disposal, as desired.

Stripping agent other than the aforementioned hydrocarbon gas may be used, such as for example, steam, or other gas. In case other stripping agent is used it may enter through line 73 and pass into the fractionating tower through stripper inlet 72. In addition other hydrocarbon gas or gases may be desired to replace or supplement the unabsorbed gases from the high pressure absorber 51 for recycling with the high pressure well fluid into the line 47, in which case propane, butane or other desired hydrocarbon gas from any source whatever, may enter the system through line 71, pressured by pump 46 and passed through line 69 into the stream of said high pressure well fluid in line 47. The high pressure dry gas in line 52 may, of course, be returned to the productive formation in the earth for cycling.

The heating coil 65 provides heat for the complete stripping of the lube oil bottoms of all lighter hydrocarbons, the heating agent being immaterial and may be heated gas, or steam, or other agent, as desired.

Figure 3:
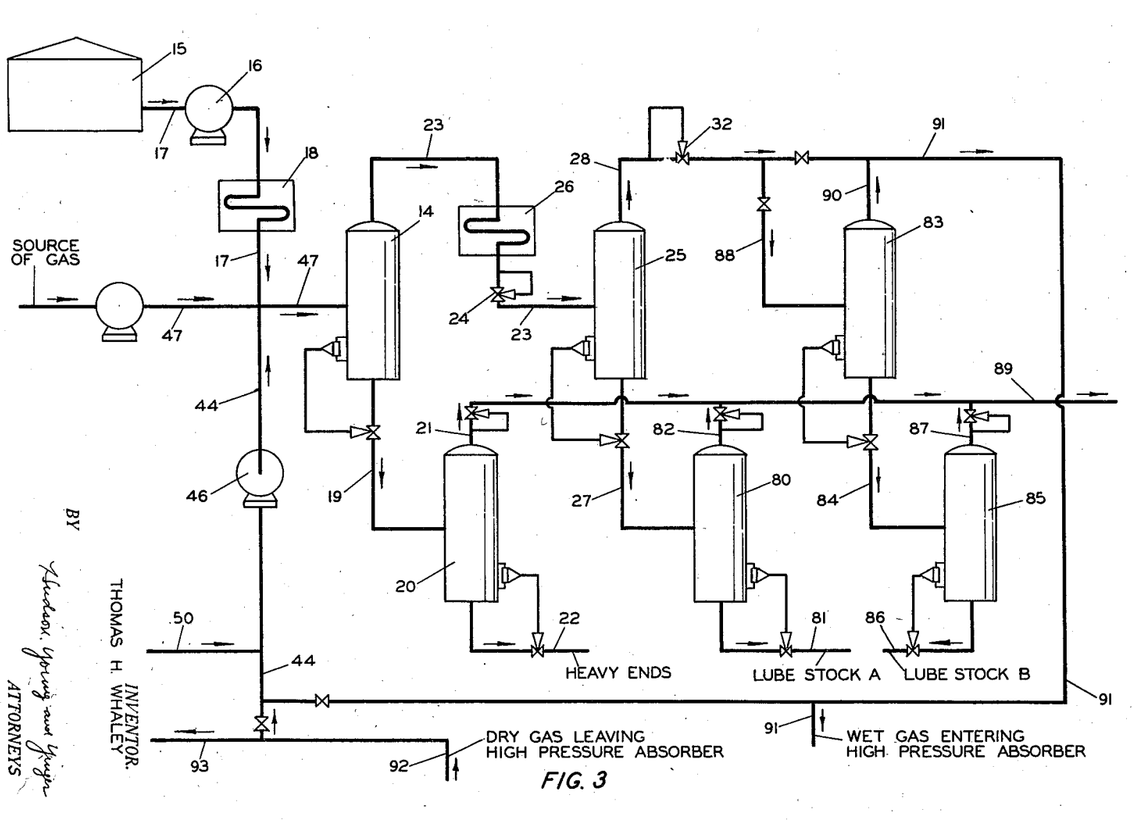
Figure 3 represents another embodiment of my invention in which one or more fractions of lubricating oil are recovered from the high pressure vapors by successive pressure reductions while the remaining lower boiling hydrocarbons are removed by a high pressure absorption process.

Figure 3 represents a third embodiment of my invention in which two or more fractions of lubricating oil stocks are separated from the high pressure vapors by retrograde condensation. In this embodiment hydrocarbon gas, at say 10,000 pounds pressure, is contacted with crude oil from line 17 and the mixture passed through line 47 into the vaporizer 14 at essentially this aforesaid pressure and at temperatures ranging from 50° to 600° F. or higher. Equilibrium vapors pass from the vaporizer by line 23 while the residual less paraffinic fraction not vaporized under these conditions is withdrawn through line 19 into separator 20. In this separator the dissolved gas is removed from the residue through pressure reduction, said gases passing out through line 21 into the main gas line 89 and the heavy less paraffinic and more asphaltic residue being withdrawn through the heavy ends line 22 for disposal as desired.

The equilibrium vapors from the vaporizer 14 pass through exchanger 26, back pressure regulator 24 and finally enter separator 25. On passage through the pressure regulator 24 the pressure on the vapors is dropped from the above mentioned 10,000 pounds to 6,000 pounds per square inch or thereabouts, in order to cause separation of a liquid phase by "retrograde condensation." At this 6,000 pounds pressure in separator 25, the liquid phase separated therein is a high molecular weight paraffinic material suitable for use as a lubricating oil stock. This stock is withdrawn from the separator vessel through line 27 into vessel 80 in which dissolved gases are flashed from the oil by pressure reduction through control valve in line 27. The flashed gas passes out through line 82 into line 89 for disposal along with the flashed gas from separator 20. The residual gas-free oil is termed Lube Stock A and passes from separator 80 through line 81 to run storage, not shown, previous to further refining treatment, such as dewaxing.

The uncondensed vapors from separator 25 pass therefrom by line 28 through back pressure regulator 32, and through line 88 into separator 83. By the pressure drop from about 6,000 pounds to 3,000–5,000 pounds per square inch through regulator valve 32 a second high molecular weight, paraffinic fraction condenses and is permitted to separate from its equilibrium vapors in separator 83. This high molecular weight fraction is, however, of lower specific gravity, less viscous and of a lighter color than the lube fraction removed in separator 25. This liquid fraction also contains dissolved gases and upon withdrawal of said oil fraction through line 84 into flash separator 85, the dissolved gases are flashed off, the pressure having been lowered by the control valve in line 84. The flashed gases pass through line 87 to join those from the other flash separators in the main gas line 89. The gas-free oil stock withdrawn through line 86 is termed Lube Stock B and passes to run storage, not shown, previous to subsequent treatment.

The residual equilibrium vapor from the separator 83 at its 3,000–5,000 pounds pressure may still contain some hydrocarbons vaporized from the oil in the vaporizer and condensible hydrocarbons from the vaporizing fluid, and may be passed to a high pressure absorption unit for removal of the remaining condensible hydrocarbons. Such high pressure absorption processes are known and may be used in cases where it is desirable or essential to maintain the residual dry gas at high pressure for recycling in high pressure processes or in high pressure distillate producing formations. Line 91 represents the high pressure wet gas from separator 83 passing to—and line 92 represents the dry gas line coming from such a high pressure absorption plant. The high pressure dry gas or a portion thereof may be repressured by pump 46 and recycled through line 44 into the line 47 for reuse in my high pressure process. If it is desired to recycle only a portion of the dry gas, the excess may be passed from the system through line 93 for disposal as desired. Similarly, if additional gas, or a gas of another character is needed, some may be introduced into the system through hydrocarbon gas inlet line 50.

My process as described in the embodiment of Figure 3, may be so operated that if only one fraction of lubricating oil is desired the equilibrium vapors from separator 25 may be passed directly to a high pressure absorption unit bypassing the separator 83, while under other conditions more than two lube oil fractions might be separated by installation of as many additional separators such as 25 and 83, as desired, along with the necessary back pressure regulators and other auxiliary equipment as needed.

The heat exchanger 18 included in the three embodiments disclosed herein, may or may not be needed depending upon conditions and results desired. In case heavy lubricating oil fractions are to be extracted from a crude oil, it is frequently helpful from an operating standpoint to increase the crude oil temperature somewhat. Similarly, exchanger 26 may be used to cool the equilibrium vapors in order to supplement the retrograde condensation with normal thermal condensation.

While I have described three embodiments including my invention, I do not wish to be limited thereto, since many combinations and variations will be evident to those skilled in the art. An example of such variation is: a fraction suitable as a lubricating oil stock may be separated from a crude oil by my process, and the remaining lower boiling fractions blended back with the asphaltic like bottoms to form a crude oil having a higher A. P. I. gravity and therefore a greater relative gasoline content than the original crude oil.

Another embodiment includes passing the crude oil directly to the vaporizer after separation of water, sludge, and excess gases therefrom. The gaseous effluent of the vaporizer is passed through two recovery tanks in series, both of which are maintained at relatively high pressures but successively lower than that of the vaporizer as in Figure 3. Due to the effect of retrograde condensation, two fractions suitable for lubricating oil stocks are separated from the vapors. The high pressure gas from the second recovery tank may be alternatively passed to a relatively low pressure condensate separator (e. g. 800–2000 pounds per square inch) or to a high pressure absorber for recovery of the lighter condensable hydrocarbons. The lighter condensable hydrocarbons may be separated into propane, butane, and distillate fractions. The residue gas from the recovery system may be recompassed for injection into an input well to an underground reservoir or for recycling to the vaporizer. Propane and butane may be returned to the vaporizer to aid in the separation of the paraffinic from the asphaltic components.

In the above description I have included a water and sludge separator 12 and a dehydrator 13 in Figures 1 and 2. It is not necessary to separate or remove all water from the crude oil or high pressure gas or well fluid unless the operating temperature and pressure results in hydrate formation at any of the cooling or expansion steps. If hydrate formation is avoided, water can be tolerated in the process. Various ways of preventing hydrate formation without removal of the water are known to those skilled in the art of production and transportation of hydrocarbons.

Emulsions may be handled in the present process without difficulty since usually the stable water-oil emulsions occur naturally only in the presence of asphaltic materials. It is not necessary to break the water-oil emulsions by chemical or other treatment prior to contacting the crude oil and the high pressure gas. At the high pressures employed herein, water is vaporized and passes over in the vapor phase leaving the emulsion-forming asphaltic components in the residual liquid phase. The water condenses, at least partially, with the retrograde condensation of components from the equilibrium vapor phase, but since the vapor phase is substantially free of emulsion-forming asphaltic hydrocarbons the condensed oil and water are easily separated from each other due to their mutual insolubility and difference in density.

"Crude oil," as referred to in this specification, means a hydrocarbon mixture comprising components having properties desirable in a lubricating oil. This includes naturally occurring mixtures of hydrocarbons as produced from the earth or selected fractions resulting from refining or separation of a crude oil into fractions. The present invention may be applied to separation of a substantially asphalt-free oil from a lubricating oil stock containing asphaltic material and prepared in a conventional manner. Lubricating oil stocks containing asphaltic materials are therefore to be considered as included by the term "crude oil."

The source of the hydrocarbon gas charged to the process as herein described is of little importance from the theoretical standpoint other than the fact that the composition of the gas has an effect upon the equilibrium obtainable in the vaporizer. From an economic standpoint, it is preferable in many instances that the gas be obtained from natural sources under high pressures or that the present process be combined with the recovery of desirable condensable components from high pressure gas or distillate wells. If the gas is recycled to the process as suggested in the figures, relatively small amounts of high pressure gas are necessary for charging to the vaporizer. The recycle may be profitably employed where the source of the gas is from a refinery process and the quantity available is limited. In case sufficient high pressure well fluid is available, recycling as hereinbefore disclosed need not be practiced, and the high pressure gases, effluent of my process, may be disposed of as desired, as for recycling into distillate formations or for the operation of power machinery, or for any other useful purpose.

The present process, therefore, comprises the fractional separation of paraffinic components suitable for lube oil stock from a crude oil stock containing undesirable asphaltic constituents by contacting the crude oil with a hydrocarbon gas at pressure of 1,000 to 10,000 pounds per square inch, preferably 2,000 to 10,000 pounds per square inch, separating the equilibrium vapor from the residuum, and recovering the paraffinic components from the vapor. Those skilled in the art will recognize that the upper pressure limit which may be employed, aside from economic considerations, is determined by the phase behavior of the system in the vaporizer. The composition of the mixture of gas and oil charged to the vaporizer, which is in turn dependent upon the composition of the gas, the composition of the oil, and the gas-oil ratio, and the temperature of the vaporizer are factors affecting the phase behavior. The pressure chosen must be such that there are two phases, i. e., a vapor phase and a liquid phase, present in the vaporizer. In practice the pressure at which the vaporizer is operated is determined by economic considerations. In general, the higher the pressure, the greater the vaporization of the heavier components, since the K constants increase above about 700 pounds per square inch, at temperatures within the operating range.

The gas-oil ratio, which determines the composition of the system in the vaporizer, also has an effect upon the vaporization of the liquid components from the crude oil. Those familiar with the effect of composition of the mixture upon the phase behavior of hydrocarbons at high pressures recognize that at a given pressure and temperature, in the isothermal retrograde condensation range, the concentration of the vaporized components in the vapor phase will be greater with the low gas-oil ratios, whereas there may be a greater percentage of the liquid vaporized in a system corresponding to a higher gas-oil ratio. The effect of the gas-oil ratio upon the K-constants is discussed by Katz and Standing on pages 202–203 of Petroleum Development and Technology, A. I. M. E., 1941. Generalizing, at any given pressure above 700–1000 pounds per square inch and within the two phase region with a relatively low gas-oil ratio the equilibrium vapor from the vaporizer contains a high concentration of the desired component in the vapor phase while a relatively low percentage of the desired component is vaporized from the oil; with an intermediate gas-oil ratio both the concentration and the percentage vaporized are fair; and with a high gas-oil ratio the concentration is low but the total percentage recovery is high. The gas-oil ratio is a variable, the absolute value of which is determined by economic considerations. The process will operate satisfactorily with gas-oil ratios in the range of 2,000 to 40,000 or more standard cubic feet per barrel. The lower limit is, of course, limited to a volume in excess of that which may be dissolved in the oil at the vaporization pressure.

In the separation of lube oil stock substantially free from asphaltic components, the temperature must be below that at which the asphaltic components are vaporized by normal vaporization attendant upon heating. The temperature ranges of operation recited in the description of the drawings are not intended to be a limiting factor, since under certain conditions as will be fully realized by those skilled in the art, this temperature range may be varied considerably. The present process may be operated with satisfactory results at temperatures within the range of about 0° F. to about 600° F., depending upon the characteristics of the lube oil fraction desired. For a paraffinic lube oil fraction substantially free of asphaltic materials temperatures within the range of about 50° F. to about 150° F. are preferred, but even these may be subject to some variations. For example, in case only a neutral or other light lubricating oil is to be separated from a crude oil the vaporizer may be operated as low as 0° F., and in case a heavy and very viscous bright stock is desired, it might be advantageous to use temperatures somewhat above 200° F. If the more volatile asphaltic components can be tolerated in the lube oil stock temperatures up to about 600° F. may be employed. The volatility of the most volatile asphaltic components and the freedom from these components desired in the final product largely affect the choice of operating temperature. In addition, the type of crude oil, the composition of the high pressure gases, the gas-oil ratio, and the operating pressure are also conditions affecting the selection of the optimum operating temperature, and such temperatures as influenced by these said factors are intended to be included within the scope of my invention. For example, Texas Gulf Coast crude oils require lower vaporizer and separator temperatures than mixed base Mid-Continent crude oils for the vaporization of lube fractions of equal viscosity. Even though in some cases the temperature of vaporization may be above 200° F., this temperature yet is extremely low for effecting the removal of lubricating oil stocks from crude oils, and herein lies one of the many advantages of my process.

A Mid-Continent crude oil and gas of the following compositions were contacted at 9,374 pounds per square inch pressure at 120° F. at a gas-oil ratio of 5,120 cubic feet per barrel:

| C-atoms per molecule | Gas, mol per cent | Crude oil, mol per cent |
|---|---|---|
| $C_1$ | 91.2 | |
| $C_2$ | 4.4 | 0.1 |
| $C_3$ | 2.0 | 1.1 |
| $C_4$ | 1.3 | 4.4 |
| $C_5$ | 0.5 | 6.1 |
| $C_6$ | 0.3 | 8.5 |
| $C_7+$ | 0.3 | 79.8 |

Approximately 80 mol percent of the crude oil was vaporized under the above given conditions of temperature and pressure, essentially all of the $C_6$ and lighter and approximately 75% of the $C_7+$ fraction being vaporized. A sample of this equilibrium vapor, after being condensed to a liquid and the hydrocarbons boiling up to 580° F. removed by distillation yielded a residue having a Conradson carbon content of 0.64%. The equilibrium vapor contained 7.8 mol per cent $C_7$ and heavier having a molecular weight of 193. When the equilibrium vapor was removed from the crude oil residue and the pressure reduced to 6,752 pounds per square inch at 120° F. a condensate was obtained having 19.7 mol per cent $C_7$ and heavier having a molecular weight of 224. This condensate had the appearance of a lubricating oil stock, having an excellent color indicating that even clay treatment for color may be unnecessary for this particular stock treated as hereinabove described. Dissolved gases and hydrocarbons boiling up to 580° F. were removed from this condensate, which then possessed a specific gravity of 0.886 or the A. P. I. equivalent of 28.2° at 60° F.

By a reduction in pressure on the original equilibrium vapor to 4,725 pounds per square inch, a second condensate was obtained at 120° F. This condensate contained 27.5 mol per cent heptanes and heavier having a molecular weight of 203. This lower molecular weight was due to the retrograde condensation of higher relative percentage of the lighter components in the group heptanes and heavier. This condensate was similar in appearance to a light neutral oil.

The uncondensed gases from this latter condensation contained the crude oil fractions lighter than the separated lubricating oil fractions, and were treated in a conventional manner for their separation. These lighter fractions included hydrocarbons normally included in the gas oils, kerosene and gasoline fractions.

While the above example is given merely as an illustration of the operation of the herein disclosed process, applicant does not wish to be limited by the given temperature, pressures, gas-oil ratio or the number of fractions taken. To those skilled in the art it will be obvious that many variations and alterations in operation may be made and yet remain within the spirit and intended scope of my invention.

What I claim is:

1. The process of separating a substantially asphalt-free lubricating oil stock from a crude oil stock containing same in admixture with asphalt which comprises contacting said crude oil stock with a light hydrocarbon gas in an amount in excess of the amount soluble in said crude oil stock, at a pressure above about 1000 pounds per square inch and within the vapor-liquid two-phase region of the resulting mixture, and at a temperature within the range of from about 0 to 600° F. and within the vapor-liquid two-phase region of said mixture, thereby effecting vaporization of a portion of the normally liquid components of said crude oil stock comprising lubricating oil stock substantially free from asphalt; removing vaporous effluent from said contacting step; reducing the pressure on said effluent to a pressure within its vapor-liquid two-phase region and above about 800 pounds per square inch; and recovering at least a portion of the normally liquid hydrocarbons comprising lubricating oil stock from said vaporous effluent at said reduced pressure.

2. The process of separating a substantially asphalt-free lubricating oil stock from a crude oil stock containing same in admixture with asphalt which comprises contacting said crude oil stock with a light hydrocarbon gas in an amount in excess of the amount soluble in said crude oil stock, and within the range of from 2,000 to 40,000 standard cubic feet of gas per barrel of oil at a pressure above about 1000 pounds per square inch and within the vapor-liquid two-phase region of the resulting mixture, and at a temperature within the range of from about 0 to 600° F. and within the vapor-liquid two-phase region of said mixture, thereby effecting vaporization of a portion of the normally liquid components of said crude oil stock comprising lubricating oil stock substantially free from asphalt; removing vaporous effluent from said contacting step; reducing the pressure on said effluent to a pressure within its vapor-liquid two-phase region and above about 800 pounds per square inch; and recovering at least a portion of the normally liquid hydrocarbons comprising lubricating oil stock from said vaporous effluent at said reduced pressure.

3. The process of separating a substantially asphalt-free lubricating oil stock from a crude oil stock containing same in admixture with asphalt which comprises contacting said crude oil stock with a light hydrocarbon gas in an amount in excess of the amount soluble in said crude oil stock, at a pressure above about 1000 pounds per square inch and within the vapor-liquid two-phase region of the resulting mixture, and at a temperature within the range of from about 50 to 200° F. and within the vapor-liquid two-phase region of said mixture, thereby effecting vaporization of a portion of the normally liquid components of said crude oil stock comprising lubricating oil stock substantially free from asphalt; removing vaporous effluent from said contacting step; reducing the pressure on said effluent to a pressure within its vapor-liquid two-phase region and above about 800 pounds per square inch; and recovering at least a portion of the normally liquid hydrocarbons comprising lubricating oil stock from said vaporous effluent at said reduced pressure.

4. The process of separating a substantially asphalt-free lubricating oil stock from a crude oil stock containing same in admixture with asphalt which comprises contacting said crude oil stock with a light hydrocarbon gas in an amount in excess of the amount soluble in said crude oil stock, and within the range of from 2,000 to 40,000 standard cubic feet of gas per barrel of oil at a pressure above about 1000 pounds per square inch and within the vapor-liquid two-phase region of the resulting mixture, and at a temperature within the range of from about 50 to 200° F. and within the vapor-liquid two-phase region of said mixture, thereby effecting vaporization of at least a portion of the normally liquid components of said crude oil stock comprising lubricating oil stock substantially free from asphalt; removing vaporous effluent from said contacting step; reducing the pressure on said effluent to a pressure within its vapor-liquid two-phase region and above about 800 pounds per square inch; and recovering at least a portion of the normally liquid hydrocarbons comprising lubricating oil stock from said vaporous effluent at said reduced pressure.

5. The process of separating a substantially asphalt-free lubricating oil stock from a crude oil stock containing same in admixture with asphalt which comprises contacting said crude oil stock with a light hydrocarbon gas comprising predominantly methane in an amount in excess of the amount soluble in said crude oil stock, and within the range of from 2,000 to 40,000 standard cubic feet of gas per barrel of oil at a pressure within the range of 1,000 to 10,000 pounds per square inch and within the vapor-liquid two-phase region of the resulting mixture, and at a temperature within the range of from about 50 to 200° F. and within the vapor-liquid two-phase region of said mixture, thereby effecting vaporization of a portion of the normally liquid components of said crude oil stock comprising lubricating oil stock substantially free from asphalt; removing vaporous effluent from said contacting step; reducing the pressure on said effluent to a pressure within its vapor-liquid two-phase region and above about 800 pounds per square inch; and recovering at least a portion of the normally liquid hydrocarbons comprising lubricating oil stock from said vaporous effluent at said reduced pressure.

6. The process of separating a substantially asphalt-free lubricating oil stock from a crude oil stock containing same in admixture with asphalt which comprises contacting said crude oil stock with a light hydrocarbon gas comprising predominantly methane in an amount in excess of the amount soluble in said crude oil stock, and within the range of from 2,000 to 40,000 standard cubic feet of gas per barrel of oil at a pressure within the range of 1,000 to 10,000 pounds per square inch and within the vapor-liquid two-phase region of the resulting mixture, and at a temperature within the range of from about 50 to 200° F. and within the vapor-liquid two-phase region of said mixture, thereby effecting vaporization of a portion of the normally liquid components of said crude oil stock comprising lubricating oil stock substantially free from asphalt; removing vaporous effluent from said contacting step; reducing the pressure on said effluent to a pressure within its vapor-liquid two-phase region and above about 800 pounds per square inch; recovering at least a portion of the normally liquid hydrocarbons from said vaporous effluent at said reduced pressure; and recycling at least a portion of the remaining vaporous effluent to said contacting step.

7. The process as defined in claim 2 wherein said light hydrocarbon gas is natural gas.

8. The process as defined in claim 2 wherein said light hydrocarbon gas is gaseous distillate well fluid.

9. The process of separating a substantially asphalt-free lubricating oil stock from a crude oil stock containing same in admixture with asphalt which comprises contacting said crude oil stock with a natural gas in an amount in excess of the amount soluble in said crude oil stock, at a pressure above about 1000 pounds per square inch and within the vapor-liquid two-phase region of the resulting mixture, and at a temperature within the range of from 0 to 600° F. and within the vapor-liquid two-phase region of said mixture, thereby effecting vaporization of at least a portion of the normally liquid components of said crude oil stock comprising lubricating oil stock substantially free from asphalt; removing vaporous effluent from said contacting step; reducing the pressure on said vaporous effluent to a pressure substantially above 800 pounds per square inch and within the vapor-liquid two-phase region of said effluent effecting separation of a part of said normally liquid components comprising lubricating oil stock; removing vaporous effluent from said separation step; and further reducing the pressure thereon to a pressure above about 800 pounds per square inch and below that in said first separation step and within its vapor-liquid two-phase region effecting further separation of normally liquid hydrocarbons.

10. The process of separating a substantially asphalt-free lubricating oil stock from a crude oil stock containing same in admixture with asphalt which comprises contacting said crude oil stock with a natural gas in the ratio of approximately 5,000 standard cubic feet of gas per barrel of oil at a pressure of approximately 9000 pounds per square inch and at a temperature of approximately 120° F., removing the vaporous effluent from said contacting step comprising lubricating oil stock substantially free from asphalt, reducing the pressure on said vaporous effluent to a pressure lower than that in said contacting step and above about 800 pounds per square inch and within the vapor-liquid two-phase region of said effluent, and recovering at least a portion of said lubricating oil stock from the effluent at said reduced pressure.

THOMAS H. WHALEY.